United States Patent
Bayer

[19]

[11] Patent Number: 5,879,261
[45] Date of Patent: Mar. 9, 1999

[54] TWO-STAGE PLANETARY GEAR UNIT

[75] Inventor: Thomas Bayer, Igersheim, Germany

[73] Assignee: Alpha Getriebebau GmbH, Igersheim, Germany

[21] Appl. No.: 860,554

[22] PCT Filed: Mar. 27, 1996

[86] PCT No.: PCT/DE96/00530

§ 371 Date: Jun. 27, 1997

§ 102(e) Date: Jun. 27, 1997

[87] PCT Pub. No.: WO96/35888

PCT Pub. Date: Nov. 14, 1996

[30] Foreign Application Priority Data

May 9, 1995 [DE] Germany ............ 195 16 420.2

[51] Int. Cl.[6] ............................................ F16H 1/46
[52] U.S. Cl. ................ 475/219; 475/330; 475/347
[58] Field of Search .................................. 475/219, 329, 475/330, 331, 337, 347

[56] References Cited

U.S. PATENT DOCUMENTS

| 3,150,544 | 9/1964 | Brass ..................... 475/330 X |
| 3,453,907 | 7/1969 | Noguchi et al. . |
| 4,430,909 | 2/1984 | Magnusson ............. 475/330 |
| 4,611,505 | 9/1986 | Cronin et al. .......... 475/23 X |
| 5,295,925 | 3/1994 | Hirabayashi ............ 475/347 |

FOREIGN PATENT DOCUMENTS

| 2342434 | 9/1977 | France . |
| 2404775 | 6/1979 | France .................... 475/330 |
| 3641656 | 8/1992 | Germany . |
| 4239331 | 6/1993 | Germany . |
| 4318334 | 12/1994 | Germany . |
| 4325295 | 2/1995 | Germany . |
| 63-214545 | 9/1985 | Japan ...................... 475/337 |
| 4-43 | 1/1992 | Japan ...................... 475/347 |
| 4-165146 | 6/1992 | Japan ...................... 475/330 |
| 40-6323374 | 11/1994 | Japan ...................... 475/329 |
| 1071837 | 2/1984 | U.S.S.R. ................. 475/330 |
| 2162259 | 1/1986 | United Kingdom ..... 475/330 |

Primary Examiner—Khoi Q. Ta
Attorney, Agent, or Firm—Collard & Roe, P.C.

[57] ABSTRACT

A two-stage planetary gear unit with a fixed gear case contains a first stage planet carrier, and a second stage planet carrier. The first stage planet carrier has a first set of rotatably mounted planet wheels and a first pinion that meshes with the first planet wheels. The second stage planet carrier is formed as a one-piece component that is mounted in the gear case and supports the first stage planet carrier. Rotatably mounted within the second stage planet carrier is a second set of two planetary wheels. Furthermore, a second pinion is housed within the second stage planet carrier and meshes with the second set of planetary wheels. There are rolling contact bearings housed within fixed gear case to support the second stage planet carrier. A clamping ring is inserted into the fixed gear case and braces two of the roller contact bearings next to each other.

9 Claims, 4 Drawing Sheets

TWO-STAGE PLANETARY GEAR UNIT

BACKGROUND OF THE INVENTION

1. Field of the Invention

The invention relates to a two-stage planetary gear unit in which there is a one piece second stage planet carrier.

2. The Prior Art

Such planetary gear units are known, for example, from DE 43 18 334 A1 and DE 42 39 331 A1.

SUMMARY OF THE INVENTION

Starting from the known embodiments mentioned above, the invention concerns itself with the problem of simplifying gear units of this kind as regards their manufacture, improving their bearing stiffness and ensuring low noise behavior with these.

The essential advantage of these embodiments lies in the configuration of the second planet carrier as a single one-piece component. This ensures extremely tilt-resistant support for the second planet carrier since, in the case of a gear unit with a speed-reducing action, the forces emanating from the output side are transmitted uniformly to both rolling-contact bearings which support the second planet carrier in the gear case.

The first internal gear is secured releasably on the second planet carrier. This has the advantage, among others, that the internal toothing of this first internal gear is simple to manufacture, for example by broaching and that it is also possible, in particular, to use a separate material.

The rolling-contact bearing of the second planet carrier, the said bearing being laid against the clamping device, simultaneously rests, radially to the inside, on the second planet carrier and the first internal gear secured on the latter. Centering of the first internal gear relative to the second planet carrier is thereby achieved in the simplest way conceivable.

As regards the supporting of the first planet carrier in the second planet carrier, an advantageous embodiment consists in bracing the rolling-contact bearing required for this support against the second planet carrier by means of the first internal gear.

In another embodiment of the Invention, the bracing of the rolling-contact bearing of the second planet carrier between the latter and the gear case is achieved in an extremely expedient manner by the fact that a clamping ring mounted adjustably on the first internal gear ensures bracing of the bearing. This method of bracing bearings is particularly expedient for bearings subject to relatively high loading.

If the bearings are subject to especially high loading then according to this, the clamping device comprises the first internal gear, which rests against the adjacent rolling-contact bearing, and a clamping spring, which can be a Belleville spring, inserted between one of the rolling-contact bearings and a counterbearing. For the abovementioned rolling-contact bearing according to claim 13, the internal gear of the first stage can serve as a folding means in the form of a stop which is mounted on.

BRIEF DESCRIPTION OF THE DRAWINGS

Exemplary embodiments of the invention are illustrated in the drawing, in which.

DETAILED DESCRIPTION OF PREFERRED EMBODIMENT

Figure 1:
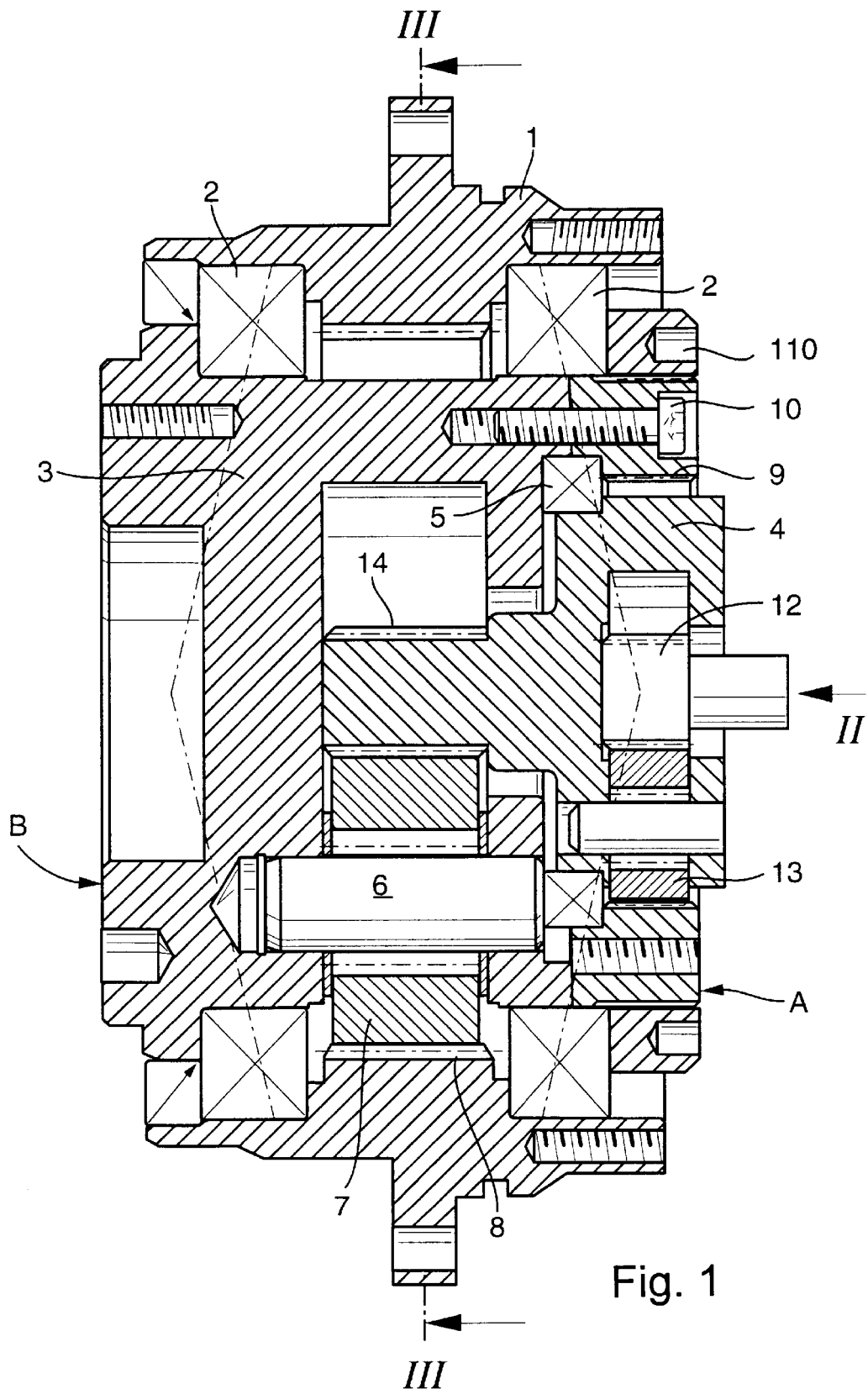
FIG. 1 shows a longitudinal section through a two-stage gear unit with the rolling-contact bearings braced firmly between the second planet carrier and the gear case.

In the embodiment shown in FIG. 1, the second planet carrier 3 of a two-stage planetary gear unit is mounted in a gear case 1 by means of rolling-contact bearings 2. The term "second planet carrier 3" here denotes the planet carrier of the second stage. The planet carrier of the first stage, denoted by the term "first planet carrier 4", is supported in the second planet carrier 3 by means of rolling-contact bearings 5. The rolling-contact bearings 2 of the second stage are radial taper roller bearings, and the single rolling-contacting bearing 5 of the first stage is a radial ball bearing.

The second planet carrier 3 is manufactured from a single compact piece of material. Mounted in it, on planet-wheel journals 6, are planet wheels, denoted as second planet wheels 7, which mesh in an internal gear 8 machined into the gear case 1.

The internal gear 9 of the first stage is a ring secured on the second planet carrier 3 by means of screws 10. Screwed onto this ring, radially to the outside, is a clamping ring 11 for bracing the rolling-contact bearings 2 of the second planet carrier 3 of the second stage within the gear case 1.

Radially to the inside, approximately half of the rolling-contact bearing 2 adjacent to end A of the first stage rests on the second planet carrier 3, on the one hand, and the first internal gear 9 on the other hand, as seen in the axial direction. This gives the advantage that the first internal gear 9 is automatically centered in the inner race of the rolling-contact bearing 2. A special centering device, which would otherwise be necessary, is thereby eliminated.

Radially to the inside, the first internal gear 9 furthermore serves to clamp the rolling-contact bearing 5 of the first planet carrier 4 against the second planet carrier 3.

If the gear unit is used as a speed-reducing gear unit, the input takes place via a first pinion 12 of the first stage, the said pinion meshing in first planet wheels 13 of the first stage, these in turn being supported, radially to the outside, in the first internal gear 9.

Power is transmitted from the first planet carrier 4 to the second gear stage via a second pinion 14 rigidly connected to the first planet carrier 4. The rolling-contact bearing 5 of the first gear stage is embodied as a radial ball bearing.

Figure 3:
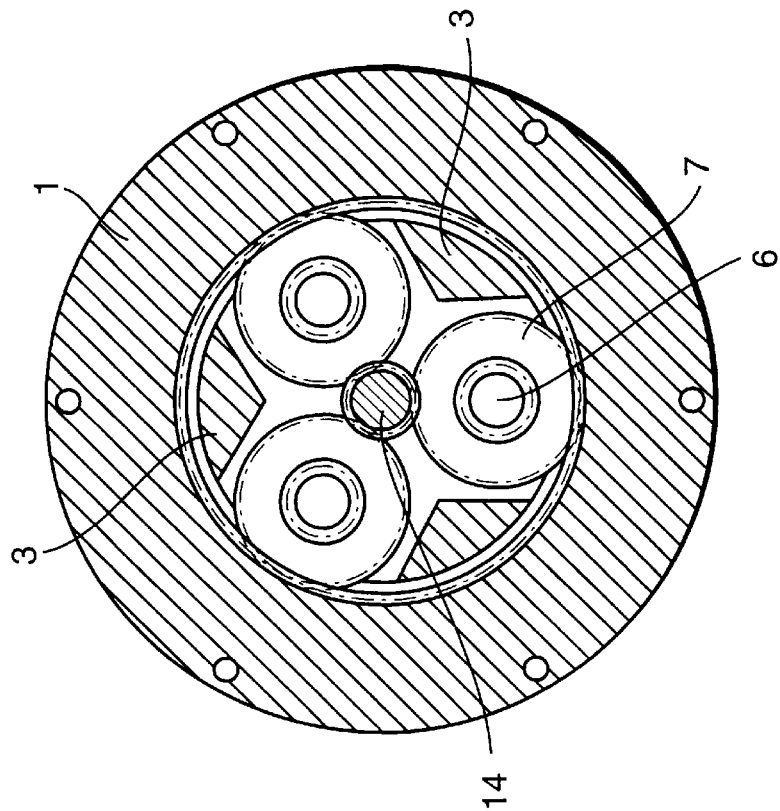
FIG. 3 shows a section through the gear unit along the line III—III.
Figure 2:
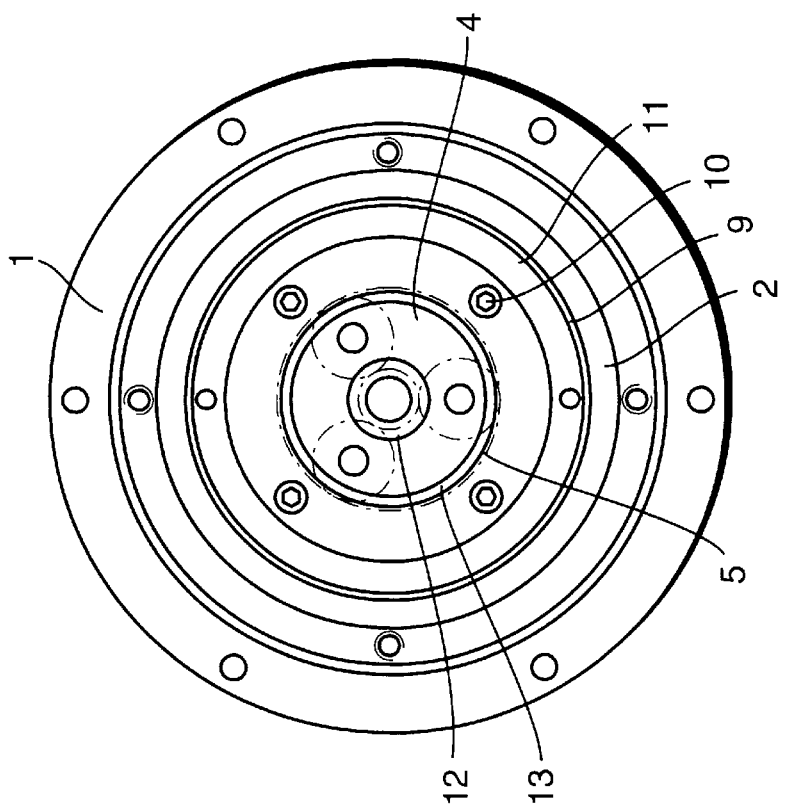
FIG. 2 shows a view of the end face A of the gear unit in the direction of arrow II.
Figure 4:
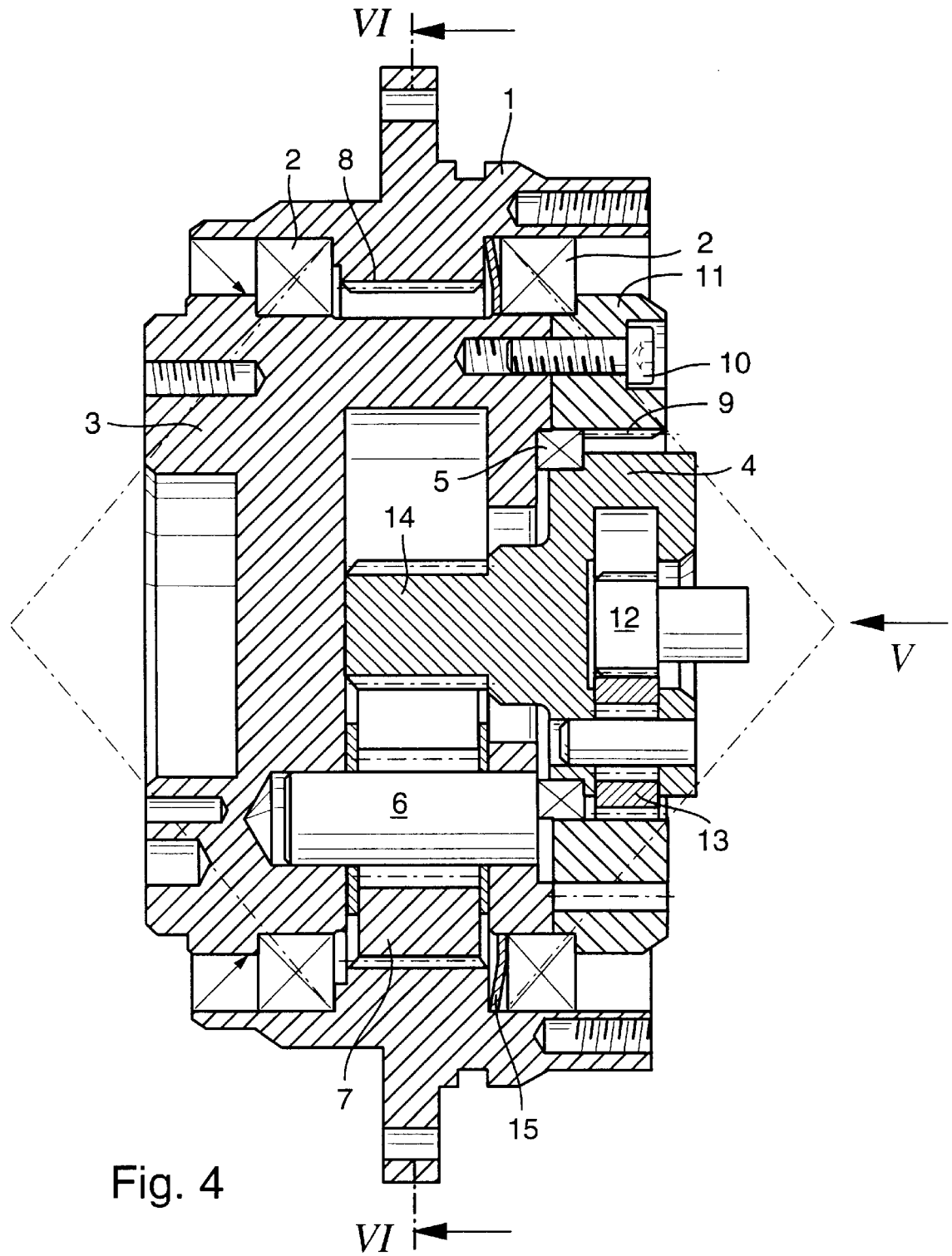
FIG. 4 shows an alternative embodiment of the gear unit in the view shown in FIG. 1 with sprung bracing of the rolling-contact bearings between the second planet carrier and the gear case.
Figure 6:
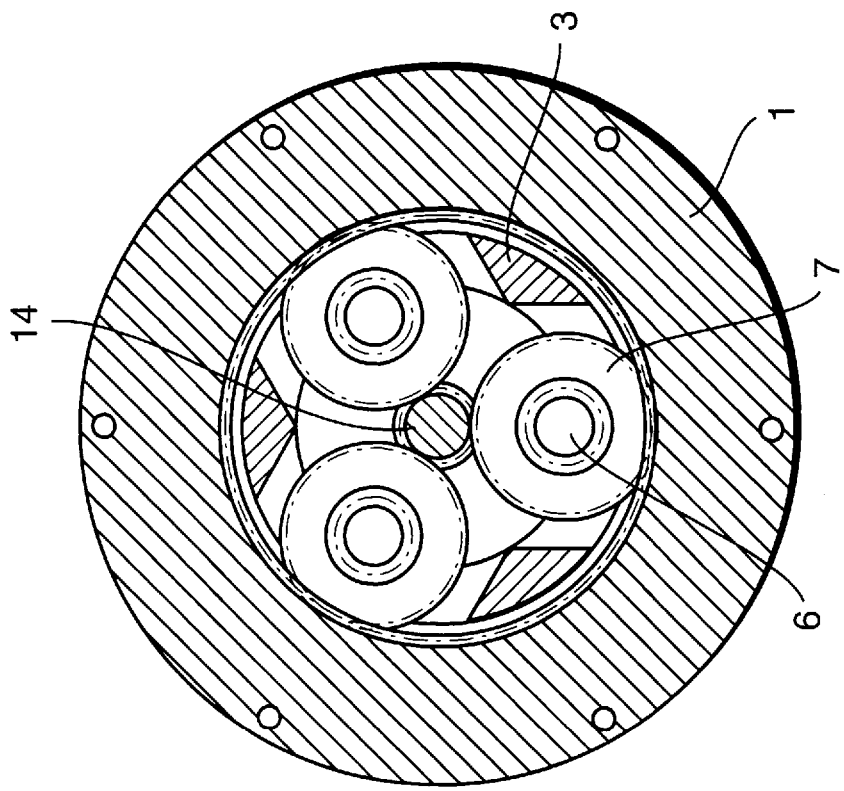
FIG. 6 shows a section through the gear unit along the line VI—VI.
Figure 5:
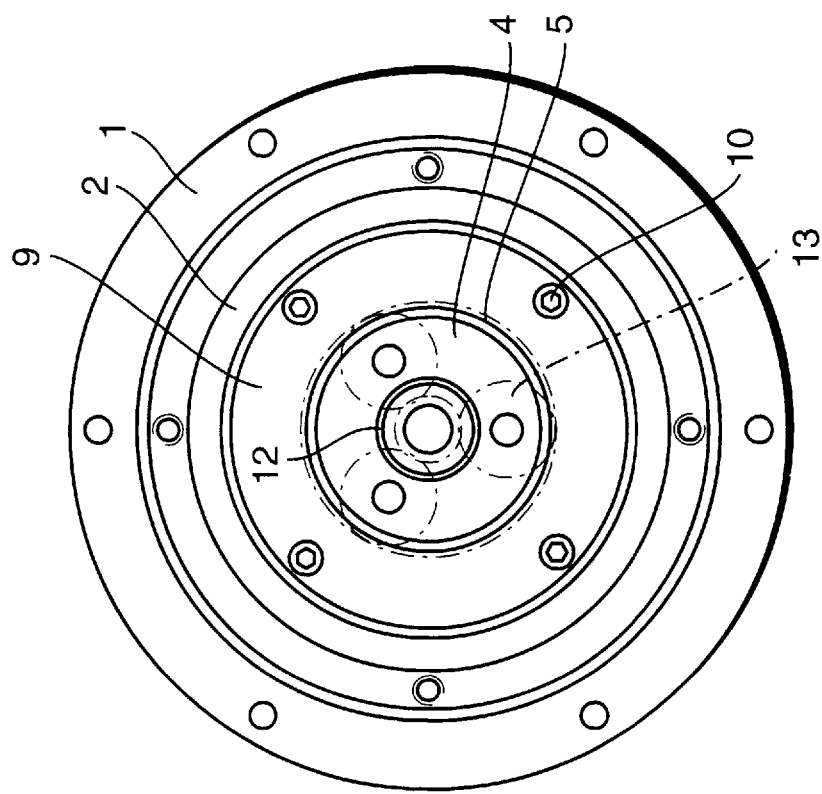
FIG. 5 shows an elevation of the end A of the gear unit in the direction of arrow V.

The embodiment of the gear unit shown in FIGS. 4–6 differs from that in FIGS. 1–3 only in that the bracing of the rolling-contact bearings 2 between the second planet carrier 3 and the gear case 1 is accomplished, with a clamping ring 110 held to second planet carrier 3 by screw 10, with the aid of a Belleville spring 15 inserted between one of the rolling-contact bearings 2 and the gear case 1. This Belleville spring 15 automatically provides preloading of the rolling-contact bearings 2 without the need to specially set this during assembly of the gear unit. When using a Belleville spring 15, for example, fixing by means of the first internal gear 9 resting against the inner race of the rolling-contact bearing 2 can be accomplished by tightening this internal gear 9 axially relative to the second planet carrier 3 until it reaches the stop position. The stop position is such that the Belleville spring 15 is still in its elastic deformation range between the relaxed and the stressed end position. However, bracing of the rolling-contact bearings 2 of the second planet carrier in this way is restricted to embodiments of the gear unit in which the rolling-contact bearings 2 are not subjected to excessive bearing forces. The limits to its use are determined by the stiffness of the Belleville spring 15 to be used. Belleville springs are just one embodiment of springs with an axial action, and so it is quite possible to use other types of spring.

In the case of the illustrated embodiments of the gear unit, the output flanges formed in the second planet carrier are provided with standardized connection dimensions.

The embodiment according to the invention of a gear unit has, inter alia, the advantage of having the capability for use as a single-stage gear unit as well, without major modifications, by the omission of the first gear stage.

What is claimed is:

1. A two-stage planetary gear unit with a fixed gear case comprising:
    a) a rotatably mounted first stage planet carrier;
    b) a first set of planet wheels mounted in said first planet carrier;
    c) a first pinion for meshing with said first planet wheels;
    d) a second stage planet carrier formed as a one piece component to provide tilt-resistant support for said first stage planet carrier;
    e) a second set of planetary wheels rotatably mounted in said second stage planet carrier;
    f) a second pinion housed within said second stage planet carrier for meshing with said second set of planetary wheels;
    g) a set of rolling contact bearings housed within said fixed gear case for supporting said second stage planet carrier;
    h) a clamping ring inserted into the fixed gear case for urging two of said rolling contact bearings next to each other, said clamping ring serving as a mounted on stop;
    i) a first internal gear within said second planet carrier fro engaging said first set of planet wheels; and
    j) a second internal gear disposed within the gear case between said rolling contact bearings engaging said second set of planet wheels.

2. The two-stage planetary gear unit according to claim 1, further comprising:
    a clamping spring inserted into said stationary base between said rolling contact bearings and said gear case, said spring for bracing said rolling contact bearings axially against said clamping ring.

3. The two-stage planetary gear unit as in claim 1, wherein said first internal gear is releasably connected to said secondary planetary carrier.

4. The two-stage planetary gear unit according to claim 2, wherein at least one rolling contact bearing of the second planet carrier is positioned between said clamping ring and said clamping spring and said first internal gear is secured onto said clamping ring.

5. The planetary gear unit according to claim 1, further comprising a second set of rolling contact bearings braced against said second planet carrier by said first internal gear.

6. The planetary gear unit according to claim 1, wherein, the clamping ring of the rolling contact bearings of the second planet carrier adjustably engages the first internal gear.

7. The planetary gear unit according to claim 2, wherein the mounted on stop is formed by the first stage internal gear.

8. The planetary gear unit according to claim 2, wherein clamping spring is a Belleville spring.

9. A two-stage planetary gear unit with a fixed gear case comprising:
    a) a rotatably mounted first-stage planet carrier;
    b) a first set of planet wheels mounted in said planet carrier;
    c) a first pinion for meshing with said first planet wheels;
    d) a one-piece second stage planet carrier formed as a one piece component to provide tilt-resistant support for said first stage planet carrier;
    e) a second set of planetary wheels rotatably mounted in said second stage planet carrier;
    f) a second pinion housed within said second stage planet carrier for meshing with said second set of planetary wheels;
    g) a set of rolling contact bearings housed within said fixed gear case for supporting said second stage planet carrier;
    h) a clamping ring adjustably mounted onto the fixed gear case for urging two of said rolling contact bearings next to each other, said clamping ring serving as a mounted on stop;
    i) a first internal gear within said second planet carrier for engaging said first set of planet wheels; and
    j) a second internal gear disposed within the gear case between said rolling contact bearing for engaging said second set of planet wheels.

* * * * *